Jan. 17, 1939.    G. M. LANE    2,144,539

VENTILATING WINDOW CONSTRUCTION

Filed May 15, 1936    2 Sheets-Sheet 2

INVENTOR
GUY M. LANE
BY
ATTORNEYS

Patented Jan. 17, 1939

2,144,539

UNITED STATES PATENT OFFICE 2,144,539

VENTILATING WINDOW CONSTRUCTION

Guy M. Lane, Detroit, Mich., assignor to Motor Products Corporation, Detroit, Mich., a corporation of New York Application May 15, 1936, Serial No. 79,999

11 Claims. (Cl. 296—44)

This invention relates generally to ventilating systems for vehicle bodies and refers more particularly to improvements in ventilating window constructions of the type having a panel supported for vertical sliding movement and having a pivoted panel supported in the window opening for swinging movement about an up and down axis.

One of the principal objects of the present invention consists in the provision of a ventilating window construction of the general type previously set forth composed of a relatively few simple parts capable of being inexpensively manufactured, assembled and installed.

Another advantageous feature of the present invention resides in the provision of a ventilating window construction of the foregoing type having means for shifting the vertical sliding panel toward and away from the adjacent edge of the pivoted panel and having additional means responsive to shifting movement of the sliding panel toward the pivoted panel for locking the latter in the plane of the window opening against swinging movement about the pivotal mounting therefor. This feature contributes to simplifying the construction of the ventilating window in that it offers the possibility of employing a relatively simple friction joint for one of the pivots of the swinging panel instead of the expensive and complicated irreversible gearing heretofore required to lock the swinging panel in its closed position.

Another object of the present invention resides in the provision of a ventilating window construction of the general type previously referred to having a division bar secured to one of the panels between adjacent edges of the latter and having a channel responsive to shifting movement of the sliding panel toward the pivoted panel to receive one of said edges and lock the pivoted panel in the window opening.

In addition to the foregoing, the present invention contemplates means for shifting the sliding panel fore and aft of the window opening in response to vertical sliding movement of the panel by window regulating mechanism. In accordance with the present invention, initial operation of the regulating mechanism to lower the sliding panel from the closed position thereof in the window opening causes the sliding panel to shift in a direction away from the pivoted panel a sufficient distance to permit unobstructed swinging movement of the latter and continued manipulation of the regulating mechanism after the sliding panel is positioned in the window opening effects a forward shifting movement of the sliding panel to lock the pivoted panel against swinging movement.

The foregoing, as well as other objects, will be made more apparent as this description proceeds, especially when considered in connection with the accompanying drawings, wherein.

Figure 1:
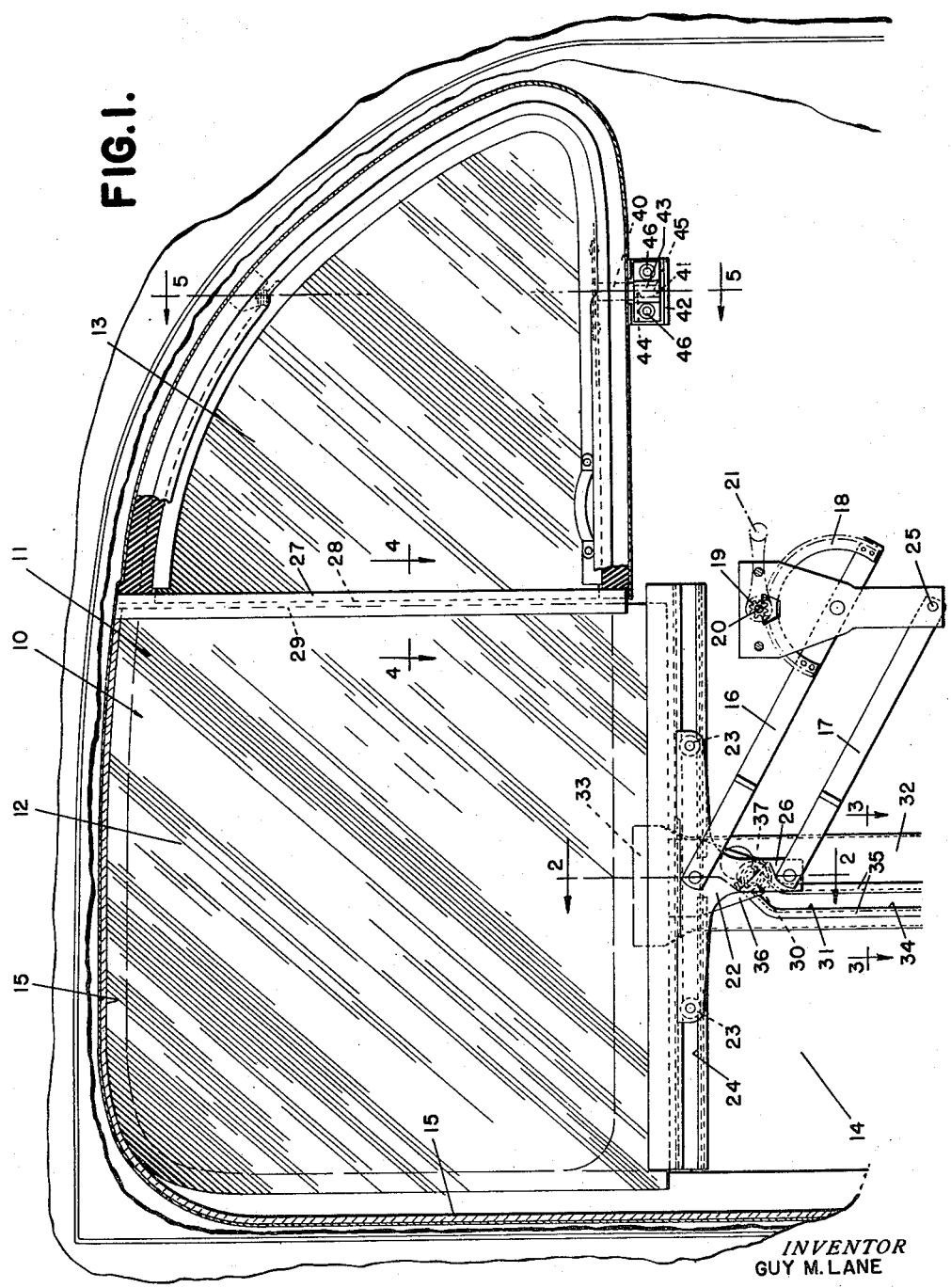
Figure 1 is a side elevational view of the ventilating window construction forming the subject matter of this invention.

Referring now more in detail to the drawings, it will be noted that in Figure 1, I have illustrated a portion of a vehicle body having a window opening 10 in one side thereof and having a ventilating window 11 for said opening. In the present instance, the ventilating window 11 comprises essentially, two transparent panels designated in the drawings by the reference characters 12 and 13. The panel 12 is mounted in the rear portion of the window opening 11 for vertical sliding movement from a position within the latter portion of the opening to a position within the usual compartment 14 provided in the body below the window opening. In accordance with conventional practice, the panel 12 is guided throughout its movement into and out of the rear portion of the window opening 10 by the usual channel shaped runway 15 having a section secured to the rear side of the window opening in such a manner as to receive the corresponding vertical edge of the panel 12 and having another portion extending along the upper side of the window opening for receiving the top edge of the panel 12 when the latter is in its closed or uppermost position. In the specific embodiment of the invention shown herein for the purpose of illustration, the panel 12 is moved into and out of registration with the rear portion of the window opening 11 in the usual manner by means of a regulator arm 16 and a guide arm 17. The lower end of the regulator arm 16 is secured to a gear segment 18 adapted to mesh with a pinion 19 secured to a shaft 20 which, in turn, is rotated by the usual operating handle 21. The upper end of the regulator arm 16 is pivotally secured to an evener 22 intermediate the ends of the latter and suitable rollers 23 are supported on opposite ends of the evener for engagement within the conventional channel retainer 24 extending longitudinally of the lower edge of the panel 12 in fixed relation thereto. The lower end of the guide arm is pivotally supported as at 25 adjacent the gear segment 18, while the opposite end thereof is pivotally connected to a depending extension 26 on the evener 22 so as to effect a vertical movement of the latter upon operation of the regulator mechanism.

The pivoted panel 13 cooperates with the sliding panel 12 to close the window opening 11 and is shown in Figure 1 as pivotally supported in the window opening for swinging movement about a substantially vertical axis located between the front and rear edges of the panel. The location of the axis of pivotal movement of the swinging panel 13 is so selected that when the panel 13 is swung to an open position, air is withdrawn from the vehicle through the slot provided at the rear of the panel 13 and is drawn into the vehicle through the opening provided at the forward end of the panel 13. It will, of course, be understood from the above that the portion of the panel 13, in rear of the axis of pivotal movement, swings outwardly with respect to the body and the portion in advance of this axis swings inwardly.

Figures 3, 4:
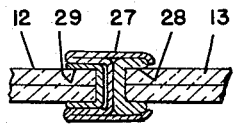
Figure 3 is a cross sectional view taken substantially on the plane indicated by the line 3—3 of Figure 1.
Figure 4 is a cross sectional view taken substantially on the plane indicated by the line 4—4 of Figure 1.
Figure 6:
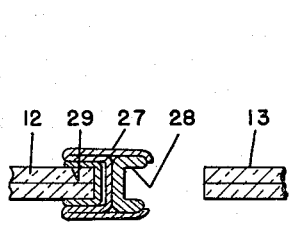
Figure 6 is a view similar to Figure 4, showing the sliding panel in a position wherein the pivoted panel is released from locking engagement therewith.

It has previously been stated that the sliding panel 12 is capable of a fore and aft movement relative to the pivoted panel 13 and also that means is provided for locking the pivoted panel 13 in the plane of the window opening in dependence upon forward shifting movement of the panel 12. For accomplishing this locking function, a division bar 27 is secured to the front edge of the panel 12 for movement therewith as a unit and is provided with a forwardly opening channel 28 of sufficient dimension to receive the adjacent rear edge of the panel 13 upon forward shifting movement of the panel 12. Upon reference to Figure 4, it will be noted that the division bar is formed of sheet metal and is also provided with a rearwardly opening channel 29 within which the forward edge of the panel 12 is secured. Both channels are equipped with weatherstrips for effectively sealing the adjacent edges of the panels in the closed positions thereof. It will, of course, be understood that the locking feature accomplished by the division bar 27 may also be effected in the event the division bar is secured to the pivoted panel rather than the sliding panel and, accordingly, the present invention contemplates this arrangement.

In the present instance, the sliding panel 12 is shifted forwardly into locking engagement with the panel 13 upon continued operation of the regulator mechanism after the panel 12 has been raised to its uppermost position in the window opening and rearward movement of the panel 12 is accomplished upon initial manipulation of the regulator mechanism to lower the latter panel into the compartment 14. It will be understood as this description proceeds that the panel 12 may be shifted rearwardly to release the panel 13 without actually moving the panel 12 from its closed position in the window opening.

In detail, shifting movement of the panel 12 by the regulator mechanism is rendered possible by a follower 30 secured to the panel 12 and engageable in a cam track 31 fixed with respect to the panel 12. Upon reference to Figure 2, it will be noted that the cam track 31 comprises a slot formed in a sheet metal section 32 extending in the direction of vertical sliding movement of the panel 12 at one side of the path of travel of the latter and having the upper end secured to the body of the vehicle as at 33. As shown in Figure 1, the slot formed in the cam track 31 is provided with a straight portion 34 extending longitudinally of the member 32 and having a length corresponding to the extent of vertical travel of the panel 12. The upper end of the straight portion of the slot is inclined in a forward direction and is of a length predetermined to provide the shifting movement of the panel 12 required to release the division bar 27 from locking engagement with the adjacent edge of the pivoted panel 13. It may be pointed out at this time that the slot in the sheet metal section 32, forming the cam track 31, is fashioned by severing or slitting the member 32 on the center line of the cam track and subjecting the same to a stamping operation to form the opposite edges of the slot with the flared guides 35 shown in Figure 3.

Figure 2:
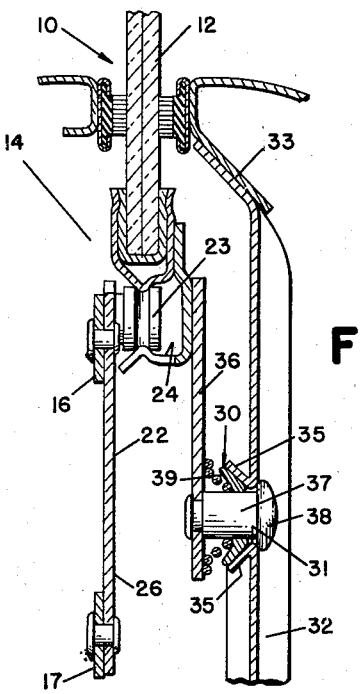
Figure 2 is a sectional view taken substantially on the plane indicated by the line 2—2 of Figure 1.

The follower 30, briefly referred to above, comprises a bracket 36 having the upper end permanently secured to the outer side of the channel retainer 24 and having a stud 37 secured to the lower end. As shown in Figure 2, the stud projects through the slot or cam track 31 and is provided with an enlarged head 38 of greater diameter than the width of the slot. Slidably supported on the stud 37 between the head 38 and bracket 36 is a spring pressed follower element 39 adapted to engage the flared seats 35 at opposite edges of the slot upon movement of the panel 12 by the regulator mechanism.

When the parts of the ventilating window construction are in the position thereof shown in Figure 1, the cam follower assumes a position in the inclined portion of the slot or cam track 31 and initial movement of the regulator mechanism in a direction to lower the panel 12 causes the latter to shift rearwardly until the follower assumes a position at the entrant end of the straight portion of the track. The extent of shifting movement is sufficient to disengage the channel 28 in the division bar 27 from the rear edge of the pivoted panel 13, whereupon the latter may be swung to an open position without interference from the panel 12. Owing to the fact that the upper end of the track is inclined, rearward shifting movement of the panel 12 also effects a lowering of the panel to a limited extent, but the depth of the portion of the channel guide 15 at the top of the panel 12 is sufficient to permit this degree of lowering of the panel 12 without actually disengaging the upper edge of the panel from the guide 15. Consequently, the panel 12 may be maintained in its closed position during the operation of the pivoted panel 13.

It necessarily follows from the foregoing that movement of the panel 12 from its lowermost position to its uppermost position causes the follower to move from the straight portion 34 of the track into the forwardly inclined portion of the latter and, in so doing, effects a forward shifting movement of the panel 12. In the event the pivoted panel is in the plane of the window opening during the aforesaid movement of the panel 12, the rear edge of the pivoted panel will be engaged in the channel 28 of the division bar 27 and thereby locked in position.

Figure 5:
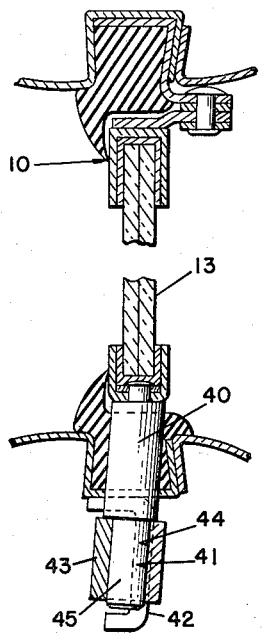
Figure 5 is a cross sectional view taken substantially on the plane indicated by the line 5—5 of Figure 1.

With the above construction, the usual complicated irreversible gearing for actuating the pivoted panel 13 may be eliminated and a relatively simple friction arrangement may be substituted therefor. As shown in Figures 1 and 5, the lower pivot 40 for the panel 13 extends through the frame of the window opening and is journalled in a friction joint 41 secured to the body structure. In the present instance, the friction joint 41 comprises a channel shaped fixture 42 secured to the underside of the bottom bar of the window frame and cooperating with a strap 43 to form a journal 44 for the reduced lower end 45 of the pivot 40. The strap is shown as located within the channel of the fixture and is secured to the base portion thereof by means of the fastener elements 46. Although the friction joint, previously described, renders it possible to operate the swinging panel 13 by exerting a lateral force on the panel adjacent the rear edge thereof, nevertheless, the friction afforded by the joint is such as to maintain the panel in any one of the several adjusted positions thereof.

Thus, from the foregoing, it will be noted that I have provided a relatively simple and inexpensive window ventilator construction capable of being readily assembled and installed in the vehicle body. It will also be observed that I have provided means responsive to the operation of the window regulator mechanism for locking the swinging panel of the ventilator in its closed position and thereby rendering it possible to eliminate the complicated actuating mechanism heretofore employed for swinging the pivoted panel.

What I claim as my invention is:

1. A window for a vehicle body having a window opening, a panel adapted to close a portion of the window opening and supported for vertical sliding movement into and out of the window opening, a pivoted panel adapted to close another portion of the opening, means for shifting the first panel transverse to the vertical sliding movement thereof in directions toward and away from the pivoted panel, and means effective upon shifting the first panel toward the pivoted panel to engage the adjacent edge of the latter and prevent swinging movement of the same.

2. A window for a vehicle body having a window opening, a panel adapted to close a portion of the window opening and supported for vertical sliding movement into and out of the window opening, a pivoted panel adapted to close another portion of the opening, means for shifting the first panel transverse to the vertical movement thereof in directions toward and away from the pivoted panel, and means actuated by said means to lock the pivoted panel against swinging movement.

3. A window for a vehicle body having a window opening, a slidable panel adapted to close a portion of the window opening, a pivoted panel located in another portion of the window opening with one edge adapted to assume a position in juxtaposition to an edge of the first panel, a division bar secured to one of the juxtapositioned edges aforesaid and having a channel for receiving the adjacent edge, and means for shifting the slidable panel fore and aft of the window opening to respectively engage the last named edge with and release the same from the channel.

4. A window for a vehicle body having a window opening, a panel slidable into and out of the window opening and movable fore and aft of said window opening, a pivoted panel supported in the window opening with one edge adjacent one edge of the slidable panel, means effective upon sliding the first panel to its extreme position in the window opening to shift the first panel in a direction toward the edge aforesaid of the pivoted panel, and means responsive to shifting movement of the slidable panel toward the pivoted panel to lock the pivoted panel against swinging movement.

5. A window for a vehicle body having a window opening, a vertically slidable panel adapted to close a portion of the window opening, a pivoted panel adapted to close another portion of the opening, means for shifting the first panel transverse to the vertical movement thereof in directions toward and away from the pivoted panel, and means effective upon shifting the first panel toward the pivoted panel to lock the pivoted panel against swinging movement and upon shifting the first panel in the opposite direction to release the pivoted panel.

6. A window for a vehicle body having a window opening, a panel slidable into and out of the window opening and movable fore and aft of said opening, a pivoted panel supported in the window opening with one edge adjacent one edge of the slidable panel, common operating means for sliding the first panel and for shifting the latter fore and aft of the window opening, and means effective upon shifting the first panel fore and aft to respectively lock the pivoted panel in the window opening and to release the latter panel.

7. A window for a vehicle body having a window opening, a panel supported in the window opening for fore and aft movement, a pivoted panel supported in the window opening with one edge thereof adjacent an edge of the first panel, and means effective upon shifting movement of the first panel toward the pivoted panel to lock the latter against swinging movement.

8. A window for a vehicle body having a window opening, a panel supported in the window opening for fore and aft movement, a pivoted panel supported in the window opening with one edge thereof adjacent an edge of the first panel, and means effective upon shifting movement of the first panel toward the pivoted panel to lock the latter against swinging movement and to also seal the space between the adjacent edges of the panels in the closed positions thereof.

9. A window for a vehicle body having a window opening, a panel supported in the window opening for fore and aft movement, a pivoted panel supported in the window opening with one edge thereof adjacent an edge of the first panel, and means effective upon shifting movement of the first panel toward the pivoted panel to lock the latter against swinging movement and to also seal the space between the adjacent edges of the panels in the closed positions thereof, said means including a cam track fixed with respect to the slidable panel and a cam follower carried by the sliding panel and engageable with the cam track.

10. A window for a vehicle body having a window opening, a panel slidable into and out of the window opening and movable fore and aft of said opening, a pivoted panel supported in the window opening with one edge adjacent one edge of the slidable panel, window regulating mechanism for sliding the first panel into and out of the window opening, means operated by the regulator mechanism to shift the first panel fore and aft of the window opening, said means including a cam track fixed with respect to the first panel and a follower carried by the latter and engageable with the cam track.

11. A window for a vehicle body having a window opening, a ventilating window comprising a vertically movable panel and a pivoted panel cooperating with each other to close the window opening, the adjacent edges of the panels extending substantially parallel to the path of travel of the vertically movable panel, means effective during the final portion of the movement of the vertically movable panel to its closed position in the window opening to shift said panel toward the pivoted panel and effective upon initial movement of the vertically movable panel toward its open position to shift the same in a direction away from the pivoted panel, and means responsive to shifting movement of the vertically movable panel toward the pivoted panel to lock the pivoted panel in the window opening and upon shifting movement of the vertically movable panel away from the pivoted panel to release said pivoted panel.

GUY M. LANE.